United States Patent [19]

Martner

[11] Patent Number: 4,682,185

[45] **Date of Patent: * Jul. 21, 1987**

[54] INK JET METHOD AND APPARATUS UTILIZING A WEB OF HOT MELT INK

[76] Inventor: John G. Martner, P.O. Box 292, Brookfield, Conn. 06804

[ * ] Notice: The portion of the term of this patent subsequent to Sep. 3, 2002 has been disclaimed.

[21] Appl. No.: 669,575

[22] Filed: Nov. 8, 1984

[51] Int. Cl.$^{4}$ ........................ G01D 15/16; G01D 9/00

[52] U.S. Cl. .................................... 346/140 R; 346/1

[58] Field of Search ............. 346/1.1, 140 R, 140 PD; 222/56

[56] References Cited

U.S. PATENT DOCUMENTS

| | | | |
|---|---|---|---|
| 1,953,257 | 4/1934 | Pierce . | |
| 2,482,245 | 9/1949 | Childers . | |
| 2,528,945 | 11/1950 | Carpenter . | |
| 2,654,552 | 8/1951 | Verdery, Jr. . | |
| 3,035,730 | 5/1962 | Newberry . | |
| 3,057,511 | 10/1962 | Mannhardt . | |
| 3,269,595 | 8/1966 | DeShon et al. . | |
| 3,294,281 | 12/1966 | Schlaf . | |
| 3,318,481 | 5/1967 | Phillips | 222/56 |
| 3,591,045 | 7/1971 | Sturrock . | |
| 3,601,281 | 8/1971 | Schlaf . | |
| 3,653,932 | 4/1972 | Berry et al. . | |
| 3,715,055 | 2/1973 | Kendrick et al. . | |
| 3,715,219 | 2/1973 | Kurz et al. . | |
| 3,828,971 | 8/1974 | Offutt et al. . | |
| 3,840,147 | 10/1974 | O'Neal et al. . | |
| 3,883,039 | 5/1975 | Wittern et al. . | |
| 3,929,255 | 12/1975 | Wittern et al. . | |
| 3,935,966 | 2/1976 | Pitel et al. . | |
| 3,952,915 | 4/1976 | Pitel et al. . | |
| 3,986,637 | 10/1976 | Wittern et al. . | |
| 3,999,682 | 12/1976 | Albright et al. . | |
| 4,061,245 | 12/1977 | Lotapetch . | |
| 4,084,725 | 4/1974 | Bushser . | |
| 4,149,653 | 4/1979 | Lennartson . | |
| 4,258,860 | 3/1981 | Boettcher . | |
| 4,363,422 | 12/1982 | Boettcher . | |
| 4,369,896 | 1/1983 | Boettcher . | |
| 4,385,713 | 5/1983 | Boettcher . | |
| 4,490,731 | 12/1984 | Vaught . | |
| 4,495,507 | 1/1985 | Moriguchi | 346/76 PH |
| 4,539,568 | 9/1985 | Lewis | 346/140 PD |

FOREIGN PATENT DOCUMENTS

| | | |
|---|---|---|
| 0097823 | 1/1984 | European Pat. Off. . |

*Primary Examiner*—E. A. Goldberg
*Assistant Examiner*—Mark Reinhart

[57] ABSTRACT

A flexible web of hot melt ink is incrementally advanced to a heater location. The web may be self-supporting or mounted on a flexible carrier web. In either case, the web is sufficiently flexible so as to be spooled.

23 Claims, 8 Drawing Figures

INK JET METHOD AND APPARATUS UTILIZING A WEB OF HOT MELT INK

BACKGROUND OF THE INVENTION

This invention relates to an ink jet wherein the ink employed within the jet is of the phase change type which may be referred to as hot melt ink.

A phase change or hot melt ink of the type utilized in an ink jet is characteristically solid at room temperature. When heated, the ink will melt to a consistency so as to be jettable. A hot melt ink jet apparatus and method of operation are disclosed in copending application Ser. No. 610,627, filed May 16, 1984, which is assigned to the assignee of this invention. The hot melt ink may be jetted from a variety of apparatus including those disclosed in the aforesaid copending application.

When employing ink in a liquid state, the delivery of the ink is, of course, dictated by the liquid state. Typically, the ink is contained within a closed vessel of some sort prior to delivery to the ink jet. When employing hot melt ink, the solid state nature of the ink suggests different ink delivery techniques.

A variety of techniques have been suggested for delivery of hot melt ink in a solid state to an, ink jet apparatus. Copending application Ser. No. 660,656, filed Oct. 15, 1984, which is assigned to the assignee of this invention, discloses the use of replaceable cartridges of hot melt ink which are heated so as to melt and drain the ink from the cartridge to a suitable reservoir. The feeding of pellets from a carrier or cartridge are disclosed in copending application Ser. No. 660,657, filed Oct. 15, 1984, which is assigned to the assignee of this invention, and copending application Ser. No. 661,922, filed Oct. 16, 1984, which is also assigned to the assignee of this invention. Both of these applications disclose feeding of discreet pellets and the discharging of those pellets into a reservoir where melting may occur. Copending U.S. patent applications Ser. No. 660,655, filed Oct. 15, 1984, now U.S. Pat. No. 4,593,292, Ser. No. 661,701, filed Oct. 16, 1984, and Ser. No. 661,034, filed Oct. 15, 1984 all disclose the feeding of an elongated slab or stick of hot melt ink which is advanced and sequentially melted.

SUMMARY OF THE INVENTION

It is an object of this invention to provide hot melt ink to an ink jet apparatus so as to minimize human intervention.

It is a further object of this invention to provide hot melt ink to an ink jet apparatus whereby the ink may be sequentially melted so as to avoid deterioration of the ink which might otherwise occur by heating a large volume of ink prior to and for an extended period of time.

It is a further object of this invention to provide a supply of hot melt ink to an ink jet apparatus which is compact and readily stored.

It is a still further object of this invention to provide a supply of hot melt ink to an ink jet apparatus which lends itself to use in a disposable cartridge which may be easily inserted and subsequently removed upon consumption of the hot melt ink within the cartridge.

In accordance with these and other objects of the invention, a preferred embodiment of the method and apparatus advances a flexible web of hot melt ink. Sequential portions of the web are heated as the web is advanced and the heated web melts so as to supply ink in a liquid state to at least one ink jet capable of ejecting droplets of liquid ink from an ink jet orifice.

In a preferred embodiment of the invention, the web of hot melt ink is carried by a spool. The web is unspooled as the web advances. Preferably, the web is incrementally advanced.

In one embodiment of the invention, the web of hot melt ink is not supported by a carrier. This eliminates the necessity to dispose of the carrier. In another embodiment of the invention, the web of ink is supported by another web of material which serves as a carrier. In one particularly preferred embodiment of the invention, the web of ink supported on the carrier comprises a series of segments having air gaps therebetween and each segment is engaged and stopped by the heater prior to melting.

Preferably, the web of hot melt ink is housed within a cartridge which is adapted to be disposable and may comprise a spool for the web of ink. The cartridge may also comprise heating means for heating the web as well as means for driving or advancing the web incrementally.

DETAILED DESCRIPTION OF PREFERRED EMBODIMENTS

Figure 2:
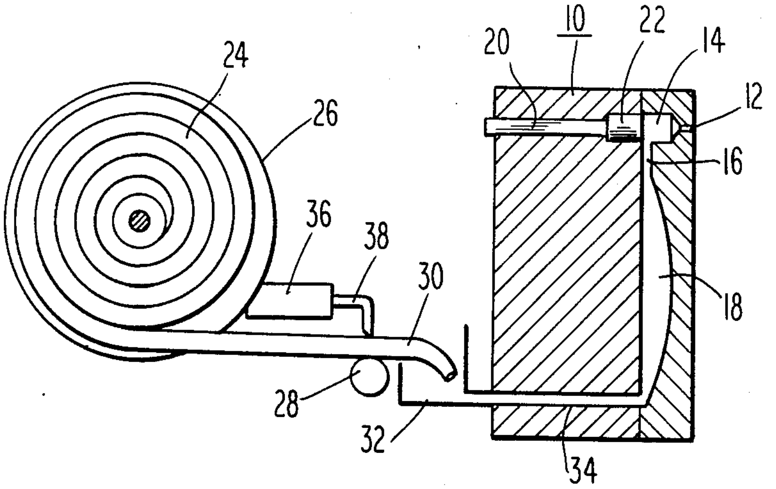
FIG. 2 is a sectional view of the ink jet imaging head of FIG. 1 in combinatin with a hot melt ink supply apparatus embodying the invention.
Figure 1:
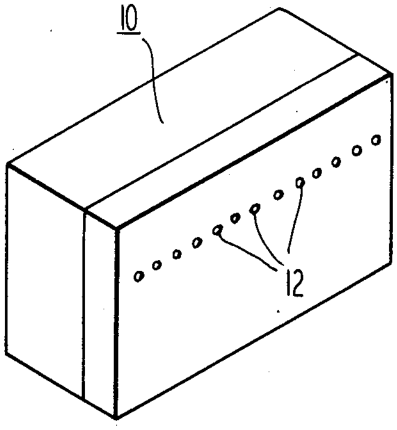
FIG. 1 is a perspective view of an ink jet imaging head.

An ink jet imaging head 10 is shown in FIGS. 1 and 2. The head 10 comprises a series of ink jet orifices 12 associated with ink jet chambers 14, each of which is capable of ejecting droplets of ink. Chambers 14 include an inlet 16 coupled to a manifold 18 which is supplied with hot melt ink in the liquid state. The volume of the chamber 14 varies in response to the state of energization of transducers 20 which are coupled to the chamber 14 through a foot 22.

In accordance with this invention, the ink to the imaging head 10 is supplied by a flexible web of hot melt ink 24, which is spooled or coiled into a roll 26 as shown in FIG. 2. In accordance with this invention, the web of ink 24 is advanced by unspooling the roll 26 so as to permit the sequential heating of portions of the web 24 at a heater 28. As the web 24 is advanced to the heater 28, the web melts in the area 30 above a trough 32 which supplies an inlet 34 to the manifold 18. A periodically energized solenoid 36 including an actuated member 38 contacts the web 24 to incrementally advance the web to the heater 28.

As shown in FIG. 2, the flexible web of ink 24 is not supported on a carrier of any kind. This is deemed to be desirable in many instances since there is no necessity to handle a carrier once the ink is melted.

Figure 5:
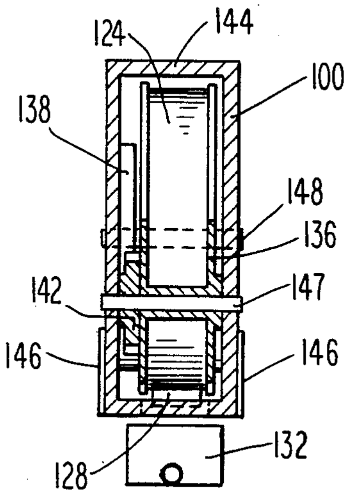
FIG. 5 is a sectional view of the cartrige shown in FIG. 4 taken along line 5—5.
Figure 3:
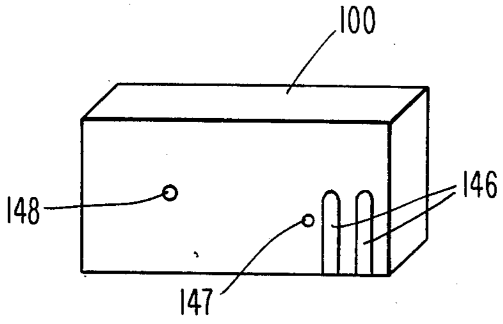
FIG. 3 is a hot melt ink cartridge representing a preferred embodiment of the invention.
Figure 4:
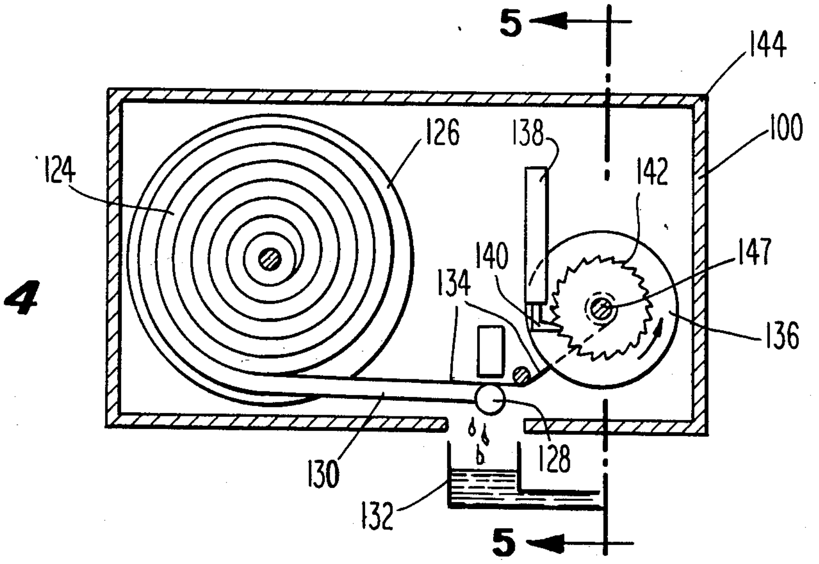
FIG. 4 is a sectinal view with the cartiridge shown in FIG. 3.

Referring now to the embodiment of FIGS. 3 through 5, a removable cartridge 100 is shown. As best shown in FIG. 4, the cartridge also includes a flexible web of ink 124 coiled into a roll or spool 126. As the spool 126 is unspooled, the web 124 is sequentially advanced to a heater 128. As a portion 130 of the web reaches the heater 128, the web is melted and droplets of ink fall into a trough 132.

In the embodiments of FIGS. 3 through 5, the web 124 of hot melt ink is supported on a carrier web 134. The spool 126 is unspooled by means of pulling the carrier web 134 past the heater 128. This is accomplished by a spring-loaded spool 136 which maintains a substantially constant tension on the web 134. Incremental advancement of the web 134 and the hot melt ink web 124 is accomplished by energizing a solenoid 138 which briefly releases the spring-loaded spool 136 as the element 140 of the solenoid moves into and out of engagement with ratchet teeth 142 on the spool 136. It will, of course, be appreciated that other mechanisms may be utilized to advance the carrier web 134 as well as the hot melt web 124.

In the embodiments of FIGS. 3 through 5, the cartridge 100 which includes a housing 144 carries electrical contacts 146. Two pairs of such contacts 146 are located on opposite sides of the cartridge 100 so as to provide an electrical connection for the solenoid 138 as well as the heater 128. The housing 144 supports shafts 147 and 148.

It will therefore be appreciated that the cartridge 100 is completely self-contained so as to provide the mechanical mechanism necessary to unspool and spool the hot melt web as well as the carrier web while at the same time provide a heater with all the necessary electrical connections so as to facilitate insertion and removal of the cartridge 100 of the ink jet apparatus which may be of the type shown in FIGS. 1 and 2.

Figure 6:
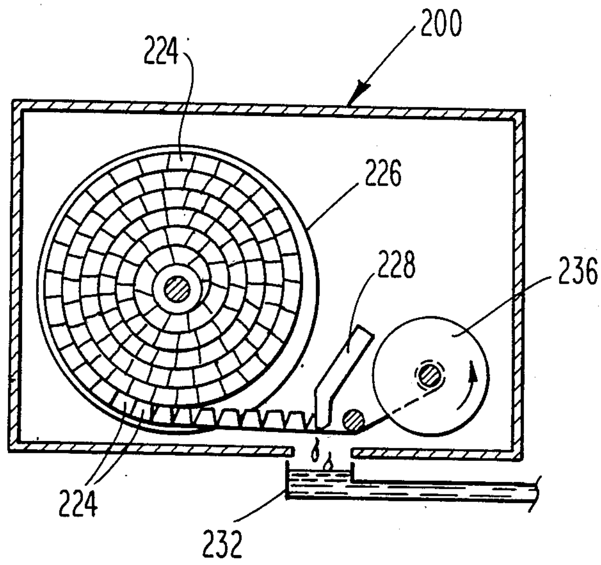
FIG. 6 is a sectional view of another cartridge representing another preferred embodiment of the invention.
Figure 6A:
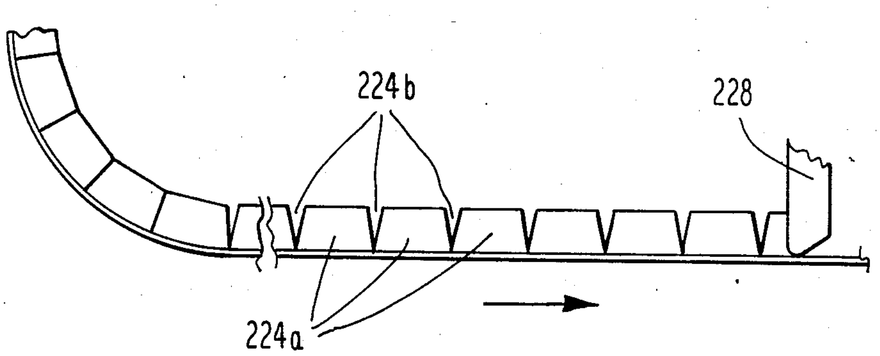
FIG. 6*a* is an enlarged fragmentary view of FIG. 6.

Another cartridge embodiment will now be described with reference to FIGS. 6 and 7. As shown there, a flexible web of hot melt ink 224 comprises a series of segments **224*a* as best shown in FIG. 6*a* which are separated respectively by gaps 224*b*. The gaps taper when the web 224 is flat as shown in FIG. 6*a* so as to permit a curvature when the web is spooled as shown in FIG. 6. This particular configuration for the web of hot melt ink 224 permits the web to be coiled on a spool 226. At the same time, the discreet segments 224*a* separated by the gaps 224*b* allow discreet volumes of melting to occur, i.e., a single segment 224*a* may be melted into the trough 232 at one time. It will be noted that the web 224 actually abuts the heater or is stopped by the heater 228 as shown in FIG. 6. Although the details of the spool winding mechanism are not shown, a carrier web spool 236 is provided as shown in FIG. 6. Once again, such a spool 236 is preferably spring-wound so as to provide uniform tension on the web 224**.

Figure 7:
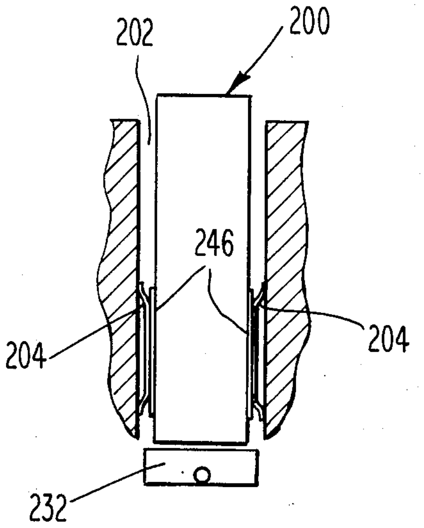
FIG. 7 is an end view of the cartridge of FIG. 6 in an ink jet apparatus.

As shown in FIG. 7, the cartridge 200 is adapted to be inserted into a receptacle 202. Receptacle 202 may include leaf springs 204 which engage contacts or pads 246 on the cartridge 200. In the embodiment of FIGS. 3 through 5, these pads 246 may serve to supply electricity to the heater 228 as well as any drive mechanism associated with the spool 236.

In the embodiments of FIGS. 3 through 7, it is possible to store a substantial volume of hot melt ink. For example, it is possible to store approximately 2.4 cubic inches or 40 cc of ink in such a cartridge by utilizing a spooled or coiled flexible web approach.

A particularly preferred ink for use in the flexible web is that disclosed in U.S. Pat. No. 4,390,369 and pending U.S. patent applications Ser. No 610,627, filed May 16, 1984, Ser. No. 565,524, filed Dec. 23, 1983 and Ser. No. 644,542, filed Aug. 27, 1984, all of which are assigned to the assignee of this invention and incorporated herein by reference.

Various details of a suitable ink jet head 10 of the type shown in FIGS. 1 and 2 are set forth in copending application Ser. No. 576,582, filed Feb. 3, 1984, as well as U.S. Pat. No. 4,459,601 and copending application Ser. No. 661,794, filed Oct. 17, 1984 which are assigned to the assignee of this invention and incorporated herein by reference.

Although preferred embodiments of the invention have been shown and described, it will be appreciated that various modifications may be made which will fall within the true spirit and scope of the invention as set forth in the appended claims.

I claim:

1. A method of operating an ink jet comprising the following steps:

advancing a flexible web of hot melt ink;
sequentially heating portions of the web as the web is advanced;
melting said sequentially heated portions of the web;
supplying the ink in the liquid state to the ink jet; and
ejecting droplets of ink from the ink jet.

2. The method of claim 1 including the step of unspooling said web of hot melt ink from a coil of ink during said advancing.

3. The method of claim 2 wherein said step of advancing incrementally advances said web.

4. The method of claim 1 including the following steps:

advancing a supporting web carrying the web of hot melt ink; and
separating said ink from said supporting web as said ink is melting.

5. The method of claim 4 including the step of unspooling the web of hot melt ink from a coil of said ink during said advancing.

6. The method of claim 5 including the step of spooling up said supporting web after said separating.

7. The method of claim 5 wherein said step of advancing incrementally advances said web of hot melt ink and said supporting web.

8. The method of claim 4 wherein said web of hot melt ink comprises a series of segments having air gaps therebetween, said method including the step of engaging each segment with said heater.

9. The method of claim 8 wherein said engaging comprises stopping said segments with said heater.

10. The method of claim 9 including the step of unspooling said web of hot melt ink from a coil of said ink during said advancing.

11. The method of claim 10 including the step of spooling up said unused web after said separating.

12. An ink jet apparatus comprising:

an ink jet chamber having an inlet and a droplet ejection orifice;
a flexible web of hot melt ink;
means for advancing said web of hot melt ink;
means for sequentially heating and melting portions of said advancing web; and
means for coupling the melted ink to said inlet.

13. The ink jet apparatus of claim 12 wherein said means for advancing comprises a spool.

14. The ink jet apparatus of claim 13 wherein said means for advancing comprises means for incrementally advancing said spool.

15. The ink jet apparatus of claim 12 further comprising a supporting web for supporting said web of hot melt ink.

16. The ink jet apparatus of claim 15 wherein said means for advancing comprises a spool.

17. The ink jet apparatus of claim 16 further comprising another spool for collecting said supporting web after melting of said ink.

18. The apparatus of claim 15 wherein said web of hot melt ink comprises a series of segments interrupted by gaps, said means for sequentially heating engaging each said segment.

19. The apparatus of claim 12 wherein said web of hot melt ink comprises a series of segments interrupted by gaps, said means for sequentially heating engaging each said segment.

20. A cartridge for supplying ink to an ink jet apparatus comprising:

a flexible web of hot melt ink;
means for advancing said web;
a spool carrying said web;
heating means for heating said web of ink; and
a supporting web juxtaposed to said web of ink.

21. The cartridge of claim 20 further comprising another spool for spooling up said supporting web.

22. The cartridge of claim 20 wherein said web of ink comprises a series of segments interrupted by gaps.

23. The cartridge of claim 22 wherein said heating means engages said ink between said gaps.

* * * * *